(12) United States Patent
Lin et al.

(10) Patent No.: US 12,224,790 B2
(45) Date of Patent: Feb. 11, 2025

(54) RADIO FREQUENCY FRONT-END SYSTEM FOR REDUCING INTERFERENCE AND METHOD FOR REDUCING INTERFERENCE

(71) Applicant: WISTRON NEWEB CORPORATION, Hsinchu (TW)

(72) Inventors: Chi-Te Lin, Hsinchu (TW); Chih-Hao Wang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 401 days.

(21) Appl. No.: 17/936,428

(22) Filed: Sep. 29, 2022

(65) Prior Publication Data
US 2023/0239001 A1 Jul. 27, 2023

(30) Foreign Application Priority Data
Jan. 22, 2022 (TW) .................................. 111102745

(51) Int. Cl.
*H04B 1/525* (2015.01)
*H04B 1/10* (2006.01)

(52) U.S. Cl.
CPC .......... *H04B 1/525* (2013.01); *H04B 1/1027* (2013.01)

(58) Field of Classification Search
CPC .......... H04B 1/02; H04B 1/04; H04B 1/0475; H04B 1/10; H04B 1/1027; H04B 1/1036; H04B 1/38; H04B 1/40; H04B 1/525; H04B 2001/1045; H04B 2001/1054; H04B 2001/1063; H04B 2001/1072
See application file for complete search history.

(56) References Cited

U.S. PATENT DOCUMENTS

| | | | | |
|---|---|---|---|---|
| 6,901,243 B2* | 5/2005 | Jayaraman | ........... | H04B 1/1036 455/63.2 |
| 7,206,564 B2* | 4/2007 | Yang | .................... | H04B 1/1027 455/226.1 |
| 8,600,436 B2* | 12/2013 | Haartsen | ................ | H04B 1/525 455/501 |
| 8,989,672 B2* | 3/2015 | Pascolini | ............... | H04B 1/525 455/67.11 |

(Continued)

FOREIGN PATENT DOCUMENTS

CN 104137424 B 3/2017

*Primary Examiner* — Quochien B Vuong
(74) *Attorney, Agent, or Firm* — McClure, Qualey & Rodack, LLP

(57) ABSTRACT

A radio frequency (RF) front-end system and a method for reducing interference are provided. The RF front-end system includes a processing circuit, a first transceiver, an RF front-end circuit, and a first antenna. The RF front-end circuit includes a first switch circuit, a first filter circuit, and a second switch circuit. The first switch circuit and the second switch circuit respectively include first signal paths and second signal paths. The first filter circuit includes an all-pass circuit corresponding to a first frequency band and a first channel filter corresponding to a first frequency channel. The processing circuit executes an anti-interference process, including: switching to the all-pass circuit; executing a channel sounding process to determine usage statuses of a plurality of channels; executing an automatic channel selection process to select a target channel; and switching to the target channel, and controlling the first transceiver to perform signal transmission.

12 Claims, 5 Drawing Sheets

(56) References Cited

U.S. PATENT DOCUMENTS

| | | |
|---|---|---|
| 10,044,381 B2 | 8/2018 | Vernon et al. |
| 10,103,772 B2 * | 10/2018 | Pehlke .................... H04B 1/40 |
| 11,362,692 B2 * | 6/2022 | Beaudin ............... H04B 1/1036 |
| 2018/0048345 A1 | 2/2018 | Pehlke et al. |

* cited by examiner

RADIO FREQUENCY FRONT-END SYSTEM FOR REDUCING INTERFERENCE AND METHOD FOR REDUCING INTERFERENCE

CROSS-REFERENCE TO RELATED PATENT APPLICATION

This application claims the benefit of priority to Taiwan Patent Application No. 111102745, filed on Jan. 22, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a radio frequency front-end system and a method for reducing interference, and more particularly to a radio frequency front-end system and a method for reducing interference that can be used to reduce adjacent channel interference.

BACKGROUND OF THE DISCLOSURE

In late 2020, the Federal Communications Commission (FCC) awarded the first WI-FI 6E device certification in the world for use on the new 6 GHz frequency band. The 6 GHz frequency band is a very important milestone for the WI-FI Alliance. Before the launch of the 6 GHz frequency band, WI-FI services and technologies can only be developed for the 2.4 GHz license-free frequency band and the 5G license-free frequency band. With the growing number of WI-FI users from year to year, the new 6 GHz can indeed provide more bandwidth to meet the additional demand arising from the increase in users.

However, many WI-FI applications still rely heavily on the 2.4G and 5G bands due to cost and security reasons and reliability issues. These applications include application in fields such as industrial, automotive, security, government and military. With so many users adopting the 2.4G and 5G bands, current WI-FI systems suffer from adjacent channel interference (ACI), LTE/5G signal interference, IoT device interference, and especially interferences from BLUETOOTH®, Zigbee®, Z-Wave and the like, which share the same 2.4 GHz frequency band in operation.

SUMMARY OF THE DISCLOSURE

In response to the above-referenced technical inadequacies, the present disclosure provides a radio frequency front-end system for reducing interference and a method for reducing interference that can be used to reduce adjacent channel interference.

In one aspect, the present disclosure provides a radio frequency front-end system for reducing interference, the radio frequency front-end system includes a processing circuit, a first transceiver, a radio frequency front-end circuit, and a first antenna. The first transceiver is connected to the processing circuit. The radio frequency front-end circuit includes a first switch circuit, a first filter circuit and a second switch circuit. The first switch circuit includes a plurality of first signal paths formed by a first common terminal and a plurality of first terminals. The first common terminal is connected to the first transceiver. The first filter circuit includes an all-pass circuit and a first channel filter respectively connected to the plurality of first terminals, and the all-pass circuit corresponds to a plurality of channels of a first frequency band, and the first channel filter corresponds to at least one first channel of the plurality of channels. The second switch circuit includes a plurality of second signal paths formed by a second common terminal and a plurality of second terminals. The plurality of second terminals are connected to the all-pass circuit and the first channel filter, respectively. The first antenna is connected to the second common terminal. The processing circuit is configured to execute an anti-interference process, including: controlling the first switch circuit and the second switch circuit to respectively switch to the first signal path and the second signal path corresponding to the all-pass circuit; executing a channel sounding process to scan the plurality of channels of the first frequency band through the first transceiver, so as to determine usage statuses of the plurality of channels; executing an automatic channel selection process to select at least one target channel according to the usage statuses of the plurality of channels; and controlling, according to the selected at least one target channel, the first switch circuit and the second switch circuit to respectively switch to the first signal path and the second signal path corresponding to the at least one target channel, and controlling the first transceiver to perform signal transmission.

In another aspect, the present disclosure provides a method for reducing interference, which is suitable for the aforementioned radio frequency front-end system. The method for reducing interference includes: configuring the processing circuit to: control the first switch circuit and the second switch circuit to respectively switch to the first signal path and the second signal path corresponding to the all-pass circuit; execute a channel sounding process to scan the plurality of channels of the first frequency band through the first transceiver, so as to determine usage statuses of the plurality of channels; execute an automatic channel selection process to select at least one target channel according to the usage statuses of the plurality of channels; and control, according to the selected at least one target channel, the first switch circuit and the second switch circuit to respectively switch to the first signal path and the second signal path corresponding to the at least one target channel, and control the first transceiver to perform signal transmission.

Therefore, in the radio frequency front-end system for reducing interference and the method for reducing interference provided by the present disclosure, an adaptive filtering system with a software-defined algorithm can detect usage statuses of channels, and switch to an appropriate channel filter to address interference issues while establishing reliable communication paths free of interference from other networks or IoT devices.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
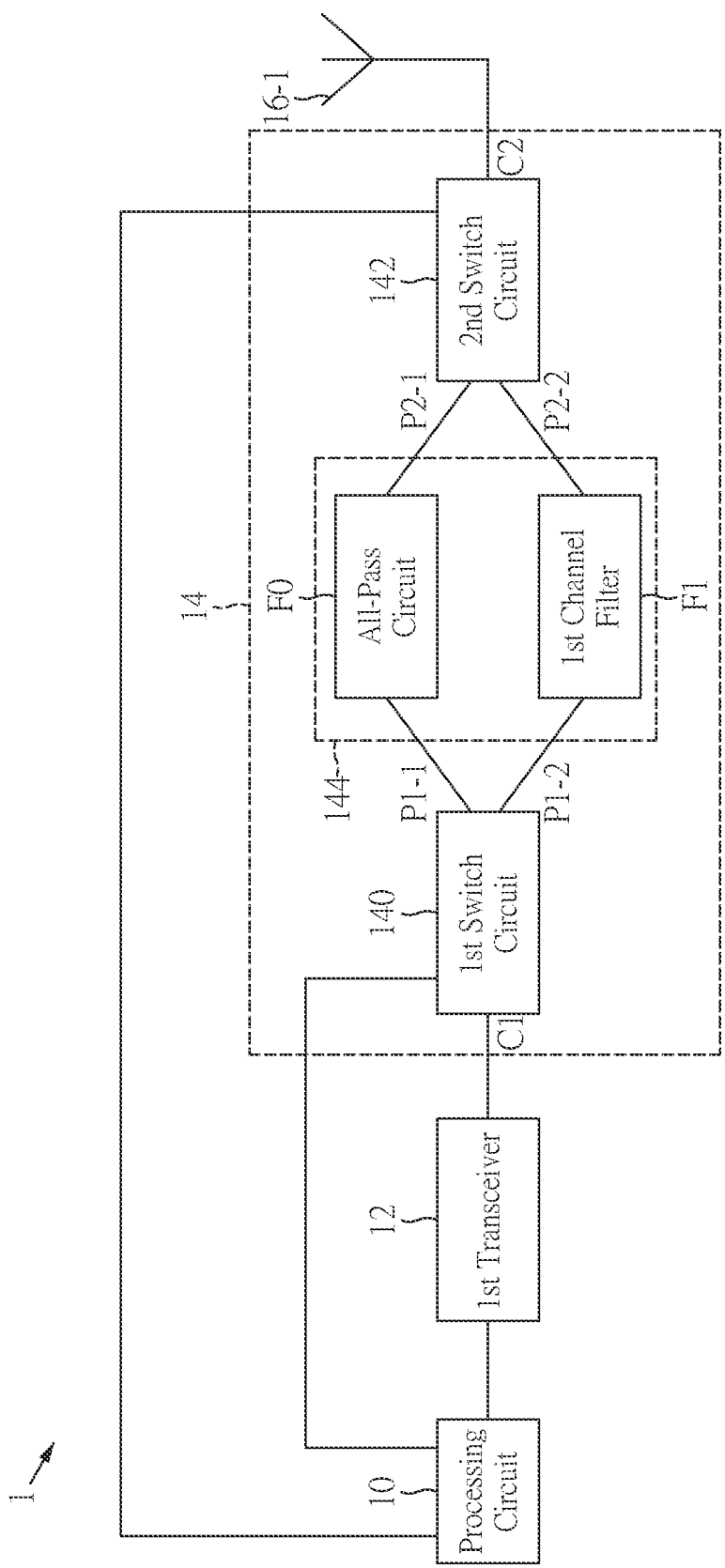
FIG. 1 is a functional block diagram of a radio frequency front-end system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like. Furthermore, the term "connect" used herein is intended to mean not only "directly connected to," but also "indirectly connected to" such as connected through another component or multiple components.

The conventional radio frequency (RF) system design only relies on an adjacent channel rejection capability of a transceiver, and there is no further solution in the RF front-end design to address the adjacent channel interference (ACI) issues. Therefore, when the network is congested, the issues of signal interruption and link rate drop are often encountered. One goal of the present disclosure is to provide a new radio frequency system design that cooperates with a software algorithm to solve the issues of frequency band congestion while establishing a reliable communication path that is not interfered by other networks or IoT devices.

First Embodiment

FIG. 1 is a functional block diagram of a radio frequency front-end system according to a first embodiment of the present disclosure. Referring to FIG. 1, a first embodiment of the present disclosure provides an RF front-end system 1 for reducing interference, and the RF front-end system 1 includes a processing circuit 10, a first transceiver 12, an RF front-end circuit 14, and a first antenna 16-1.

The processing circuit 10 can include a combination of one or more of the following: a microprocessor, a controller, a microcontroller, a central processing unit, a digital signal processor, an application specific integrated circuit, a field programmable gate array, or any other devices suitable for computing. Furthermore, the processing circuit 10 can execute instructions stored in a memory of the processing circuit 10, and realize all the functions, features and effects of the processing circuit described herein in a form of software, hardware or firmware.

The first transceiver 12 is connected to the processing circuit 10. In some embodiments, the first transceiver 12 can include one or more of a radio frequency transceiver circuit and a baseband processing circuit, and is controlled by the processing circuit 10.

To address the ACI issues, the RF front-end circuit 14 of the first embodiment of the present disclosure includes a first switch circuit 140, a second switch circuit 142, and a first filter circuit 144. The first switch circuit 140 includes a plurality of first signal paths formed by a first common terminal C1 and a plurality of first terminals (e.g., first terminals P1-1 and P1-2), and the second switch circuit 142 includes a plurality of second signal paths formed by a second common terminal C2 and a plurality of second terminals (e.g., second terminals P2-1 and P2-2). The first common terminal C1 is connected to the first transceiver 12.

In some embodiments, the first switch circuit 140 and the second switch circuit 142 can be, for example, single pole double throw (SPDT) switches, or multiple switches can be combined to form a multi-path switching structure as required, for example, a combination of multiple SPDT switches or a single pole multiple throw that has 4, 6, or more ports can be utilized.

The first filter circuit 144 includes an all-pass circuit F0 and a first channel filter F1 connected to the plurality of first terminals, respectively, and the second terminals P2-1 and P2-2 are connected to the all-pass circuit F0 and the first channel filter F1, respectively. The all-pass circuit F0 corresponds to a plurality of channels of the first frequency band, and the first channel filter F1 corresponds to at least one first channel of the plurality of channels. In the embodiments of the present disclosure, an anti-ACI capability can be improved specifically for the WI-FI 2.4 GHz frequency band. Therefore, the first frequency band can be the WI-FI 2.4 GHz frequency band, and the all-pass circuit F0 can be, for example, an out-of-band filter for the WI-FI 2.4 GHz frequency band that can be used to filter out signals outside the WI-FI 2.4 GHz band. When the all-pass circuit F0 is the out-of-band filter, for example, a surface acoustic wave (SAW) filter can be utilized, which is widely used as a band pass filter (BPF) and an antenna diplexer in mobile communication devices. In an alternative embodiment, the all-pass circuit F0 can be, for example, a signal transmission line. However, the above are only examples, and the present disclosure is not limited thereto.

Correspondingly, the first frequency band is the WI-FI 2.4 GHz frequency band, which includes eleven channels, and the at least one first channel can correspond to channel 1 of the eleven channels. For example, the first channel filter F1 can be a band-pass filter that at least corresponds to channel 1, and the first channel filter F1 can also be, for example, a SAW filter or a bulk acoustic wave (BAW) filter. In some embodiments, the first channel filter F1 can be a bandpass filter corresponding to channel 1 and channel 2.

The first antenna 16-1 is connected to the second common terminal C2. The first antenna 16-1 can include one or more antennas or antenna arrays for transmitting and/or receiving wireless signals. The first antenna 16-1 can be coupled to the RF front-end circuit 14, and can be any type of antenna capable of wirelessly transmitting and receiving data and/or signals. In some embodiments, the first antenna 16-1 can include one or more omnidirectional, fan-beam or patch antennas operable to transmit/receive radio signals between, for example, 2 GHz and 66 GHz. Omnidirectional antennas can be used to transmit/receive radio signals in any direction, fan-beam antennas can be used to transmit/receive radio signals from devices within a specific area, and patch antennas can be a line-of-sight antenna used to transmit/receive radio signals in a relatively straight line.

It should be noted that, although not shown in FIG. 1, the RF front-end system 1 can further include elements provided in a power amplifier (PA), a low noise amplifier (LNA), and a receiver, in which such components process original incoming RF signals and then convert the processed signals into a lower intermediate frequency (IF). In addition, the RF front-end system 1 can further include a local oscillator (LO) for generating the RF signal. However, since the above-mentioned elements are not the focus of the present disclosure, the related descriptions are omitted hereinafter.

Figure 2:
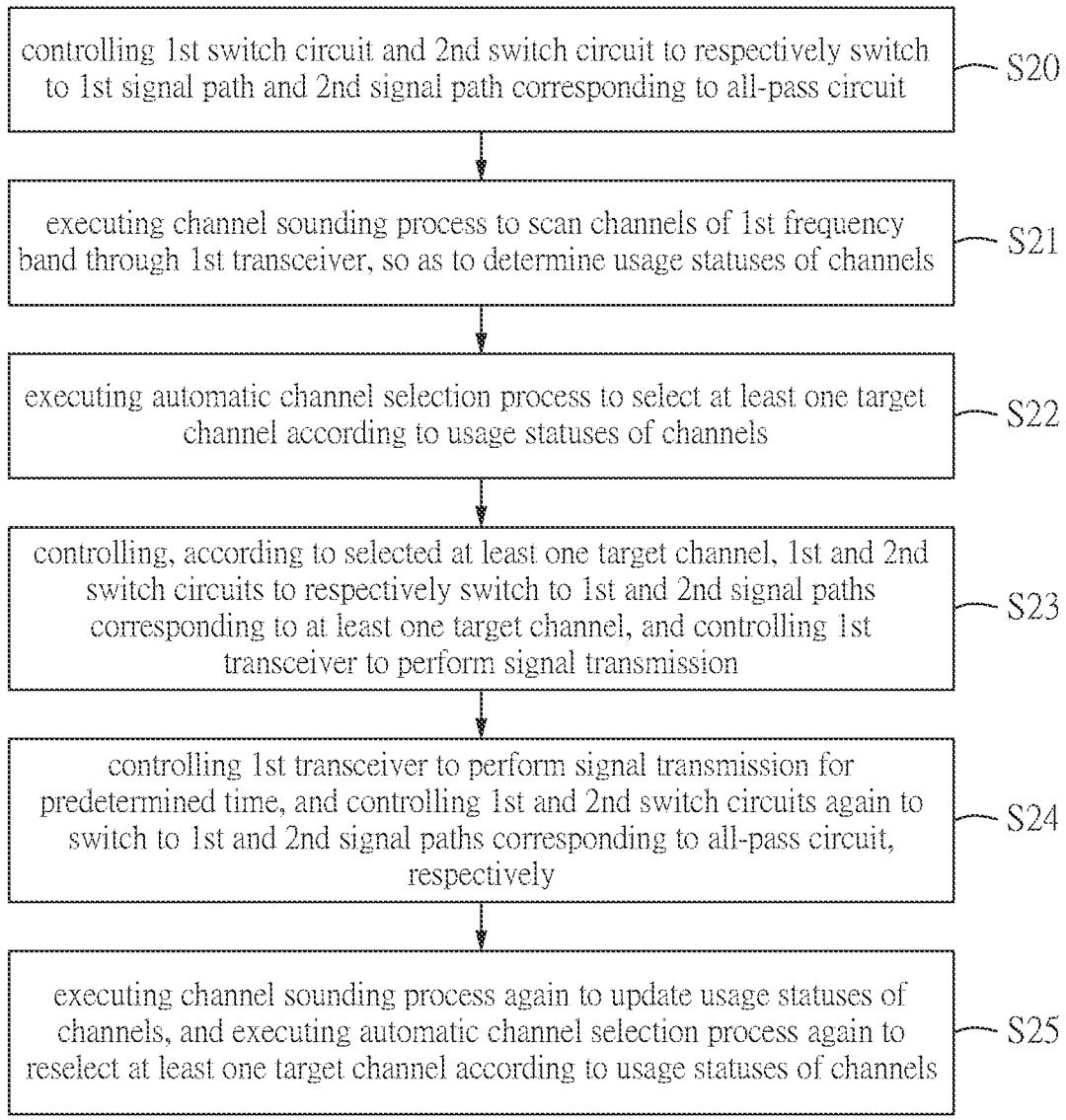
FIG. 2 is a flowchart of a method for reducing interference according to the first embodiment of the present disclosure.

Reference is made to FIG. 2, which is a flowchart of a method for reducing interference according to the first embodiment of the present disclosure. As shown in FIG. 2, the method for reducing interference is applicable to the RF front-end system 1 of FIG. 1, but the present disclosure is not limited thereto. In FIG. 2, the method for reducing interference includes configuring the processing circuit 10 to execute an anti-interference process that includes the following steps:

Step S20: controlling the first switch circuit and the second switch circuit to respectively switch to the first signal path and the second signal path corresponding to the all-pass circuit. For example, when the RF front-end system is initialized, an RF path is switched to a full-band path so as to complete a spectrum analysis in an environment.

Step S21: executing a channel sounding process to scan the plurality of channels of the first frequency band through the first transceiver, so as to determine usage statuses of the plurality of channels.

In this step, the processing circuit 10 executes an algorithm to receive channel state information (CSI) of all channels to perform a detection process, so as to measure usage statuses of all channels, and to use the cleanest (i.e., minimum noise and interference) channel as a target channel to be subsequently switched to.

More specifically, the processing circuit 10 controls the first transceiver 12 and the first antenna 16-1 through an application programming interface (API) command to query channel state information of each channel, and the channel state information includes channel activity time, channel busy time, channel transmission time, channel reception time, received signal strength indicator (RSSI) value, and noise information.

Step S22: executing an automatic channel selection process to select at least one target channel according to the usage statuses of the plurality of channels. In this step, the processing circuit 10 performs weighted calculation on quality of each channel according to the channel activity time, the channel busy time, the channel transmission time, the channel reception time, and the noise information, and finally obtains channel numbers that are recommended to be selected. The automatic channel selection process relies on these values to build interference factors to acknowledge how much interference is detected on the channels, and then selects the channel that has the fewest interference factors.

Specifically, the channel activity time includes the time spent on the radio frequency transmission on the channel. The channel busy time includes the time spent in the radio frequency transmission on the channel while the channel is busy and communications cannot be initiated. The channel transmission time and the channel reception time are the time spent on data transmission and data reception on the channel, respectively. The noise information includes unidentifiable RF energy.

For example, in a wireless monitoring network system, a plurality of monitoring devices and wireless access points integrating signals of the monitoring devices are set up. In this case, it is desirable that the communication channels between the monitoring devices and the wireless access points can be protected while unwanted network signals are filtered. In response to the processing circuit 10 determining that the interference to the channels of the first frequency band is small in the environment, any channel of the first frequency band can be directly selected as the target channel, and the all-pass circuit F0 is used to perform signal transmission. Generally, in the first frequency band (i.e., 2.4 GHz frequency band), channels 1, 6 and 11 are the only three non-overlapping channels, therefore, a better communication quality can be obtained by selecting channels 1, 6 and 11. However, the frequently used channels of the first frequency band, such as channel 2 to channel 10, especially channel 6, are usually used by most electronic devices operating in the 2.4 GHz frequency band, and are often busy and interfere with each other. In response to the processing circuit 10 determining that the frequently used channels of the first frequency band in the environment, such as channel 2 to channel 10, have greater interference, channel 1 can be selected as the target channel to address the 2.4 GHz frequency band congestion issues by avoiding the frequently used channels. In some instances, the frequently used channels can be, for example, channel 3 to channel 9, and therefore channel 1 or channel 2 can also be selected as the target channel.

By executing the above process, the processing circuit 10 helps the wireless monitoring network system to determine an appropriate target channel after weighting the channel quality of the entire 2.4 GHz frequency band according to the channel state information (CSI) of the channel. In another embodiment, the processing circuit 10 can select the target channel only according to the received signal strength indicator (RSSI) value. For example, in response to the processing circuit 10 determining that the RSSI values of channels 2 to 10 are relatively high, channels 2 to 10 may be in a busy state with greater interference, and channel 1 (channel 11 can also be selected in subsequent embodiments) can be selected as the target channel according to the RSSI values of channels 2 to 10.

Step S23: controlling, according to the selected at least one target channel, the first switch circuit and the second switch circuit to respectively switch to the first signal path and the second signal path corresponding to the at least one target channel, and controlling the first transceiver to perform signal transmission.

For example, when channel 1 and/or channel 2 of the eleven channels are/is selected, the first switch circuit 140 can be controlled to be switched to the first signal path formed of the first common terminal C1 and the first terminal P1-2, and the second switch circuit 142 can be controlled to be switched to the second signal path formed of the second terminal P2-2 and the second common terminal C2, so as to filter out the signals from channels other than the channel 1 and/or the channel 2 through the first channel filter F1, thereby addressing the ACI issues.

To maintain the communication quality of the selected channel, in some embodiments, the method for reducing interference further includes configuring the processing circuit 10 to perform the following steps:

Step S24: controlling the first transceiver to perform signal transmission for a predetermined time, and controlling the first switch circuit and the second switch circuit again to switch to the first signal path and the second signal path corresponding to the all-pass circuit, respectively.

Step S25: executing the channel sounding process again to update the usage statuses of the plurality of channels, and executing the automatic channel selection process again to reselect the at least one target channel according to the usage statuses of the channels.

In other words, the channel sounding process and the automatic channel selection process can be executed periodically to re-determine the signal path to be selected to ensure the communication quality.

Second Embodiment

Figure 3:
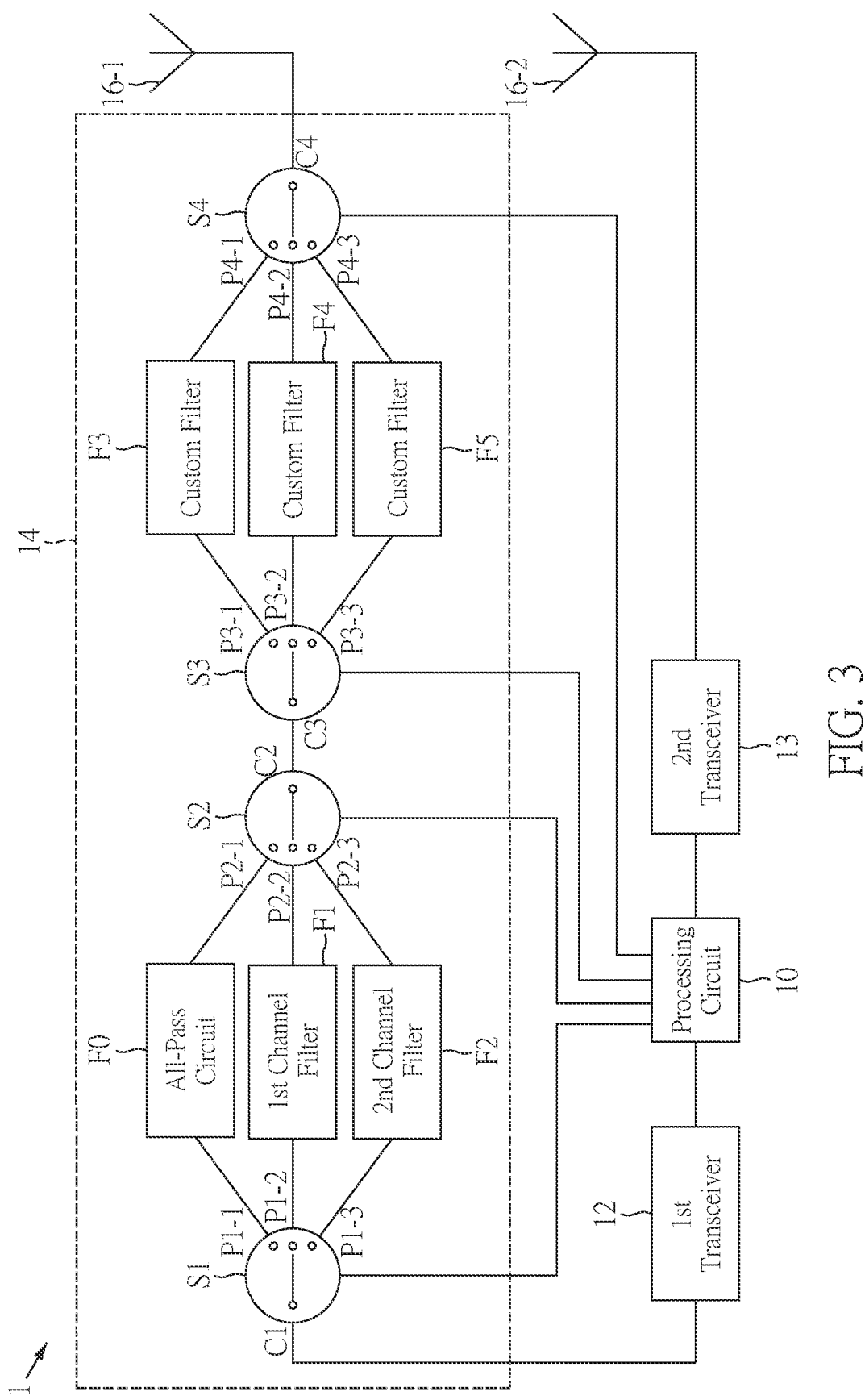
FIG. 3 is a functional block diagram of a radio frequency front-end system according to a second embodiment of the present disclosure.

Reference is made to FIG. 3, which is a functional block diagram of a radio frequency front-end system according to a second embodiment of the present disclosure. As shown in FIG. 3, the second embodiment of the present disclosure further provides an RF front-end system 1 for reducing interference, which includes a processing circuit 10, a first transceiver 12, a second transceiver 13, a radio frequency front-end circuit 14, a first antenna 16-1, and a second antenna 16-2. It should be noted that, in FIG. 3, the same components as those of the first embodiment are denoted with the same reference numerals, and the details thereof are not repeated.

The difference between this embodiment and the first embodiment is that the first switch circuit 140 and the second switch circuit 142 are directly replaced by single pole triple throw (SP3T) switches 51 and S2, furthermore, the first filter circuit 144 includes a second channel filter F2, the first terminals (e.g., the first terminals P1-1, P1-2, P1-3) are connected to the all-pass circuit F0, the first channel filter F1, and the second channel filter F2, respectively, and the second terminals (e.g., the second terminals P2-1, P2-2, P2-3) are connected to the all-pass circuit F0, the first channel filter F1, and the second channel filter F2, respectively.

Similarly, since the first frequency band is the WI-FI 2.4 GHz frequency band, which includes eleven channels, at least one second channel can at least correspond to channel 11 of the eleven channels, for example, the second channel filter F2 can be a bandpass filter at least corresponding to channel 11, and the second channel filter F2 can also be, for example, a SAW filter or a BAW filter. In some embodiments, the second channel filter F2 can be a bandpass filter corresponding to channel 11 and channel 10.

The RF front-end circuit 14 further includes a third switch circuit, a fourth switch circuit, and a second filter circuit 146.

The third switch circuit can be, for example, an SP3T switch S3, which includes a plurality of third signal paths formed by a third common terminal C3 and a plurality of third terminals (e.g., the third terminals P3-1, P3-2, P3-3), and the third common terminal C3 is connected to the second common terminal C2. Similarly, the fourth switch circuit can be, for example, an SP3T switch S4, which includes a plurality of fourth signal paths formed by a fourth common terminal C4 and a plurality of fourth terminals (e.g., fourth terminals P4-1, P4-2, P4-3).

In addition, the second filter circuit 146 includes a plurality of custom filters (e.g., three custom filters F3, F4, F5) respectively connected to the third terminals (e.g., the third terminals P3-1, P3-2, P3-3), and respectively correspond to a plurality of custom frequency bands, in addition, the plurality of fourth terminals (e.g., the fourth terminals P4-1, P4-2, P4-3) are connected to the custom filters (e.g., the three custom filters F3, F4, F5).

For example, the custom filters F3, F4, and F5 can be an LTE suppression filter, a 5G suppression filter, and an IoT device suppression filter, respectively. The IoT device suppression filter can filter out the frequency band that the wireless network protocols such as BLUETOOTH®, Zigbee®, and Z-Wave are located at, therefore it can be used to filter for a specific frequency band according to user needs or regions (for example, in order to comply with relevant regulations of the United States or the European Union). Alternatively, additional paths can be added to the RF front-end circuit 14 to flexibly meet more specific requirements depending on the field of applications.

On the other hand, the RF front-end system 1 further includes the second transceiver 13 and the second antenna 16-2. The second transceiver 13 is connected to the processing circuit 10, and the second antenna 16-2 is connected to the second transceiver 13. The second transceiver 13 can include one or more of a radio frequency transceiver circuit and a baseband processing circuit, and is controlled by the processing circuit 10, and the second antenna 16-2 can include one or more antennas or antenna arrays for transmitting and/or receiving wireless signals.

In this embodiment, the second transceiver 13 and the second antenna 16-2 are further provided to serve as a dedicated scanner to check the usage status of each channel in real time. Therefore, the processing circuit 10 can directly switch to the selected at least one target channel without the need to switch to the all-pass circuit F0 for full-channel scanning, which smooths the switching process and the requirements of real-time applications are met.

Figure 4:
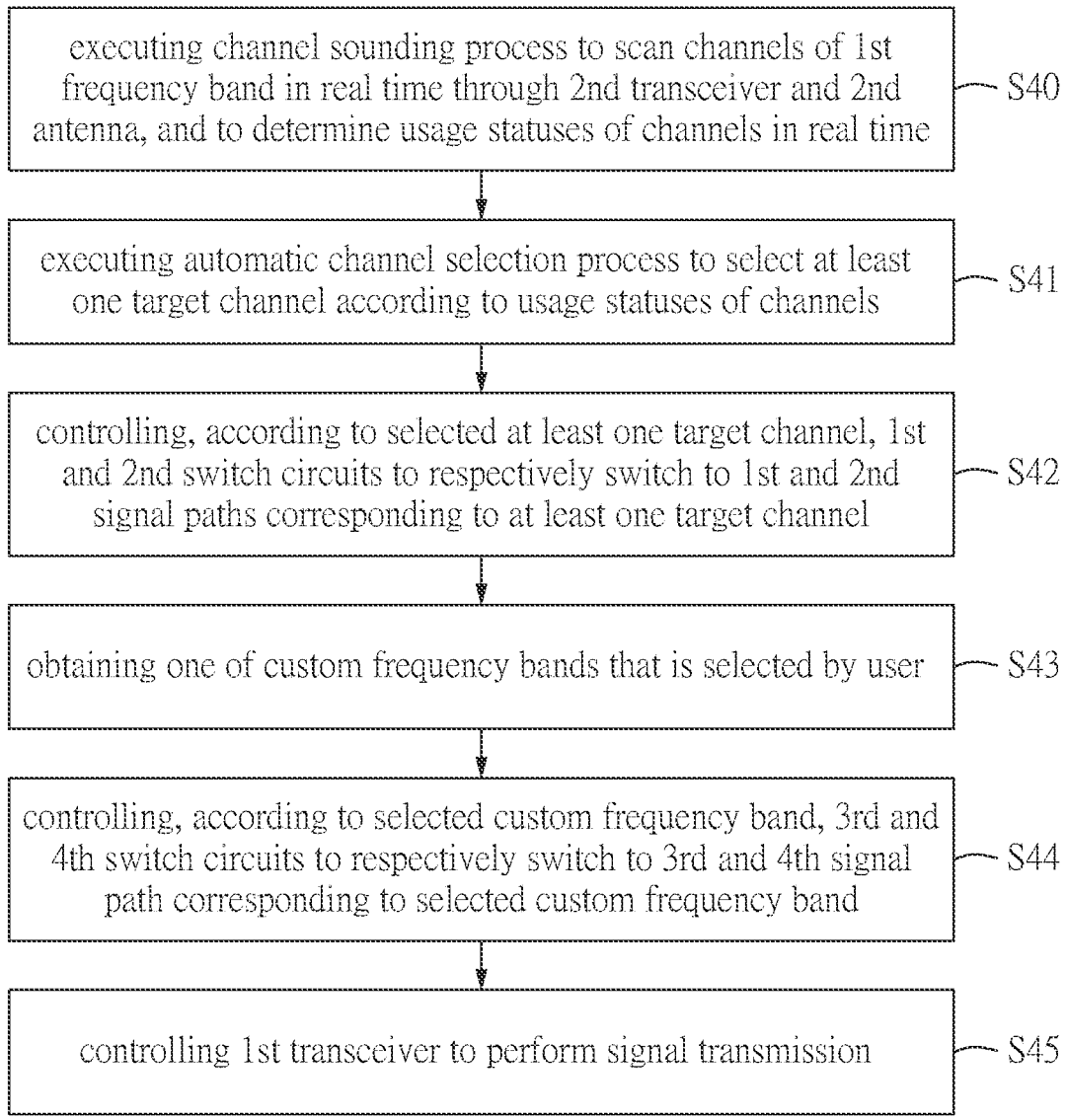
FIG. 4 is a flowchart of a method for reducing interference according to the second embodiment of the present disclosure.

Reference is made to FIG. 4, which is a flowchart of a method for reducing interference according to the second embodiment of the present disclosure. As shown in FIG. 4, the method for reducing interference is applicable to the RF front-end system 1 of FIG. 3, but the present disclosure is not limited thereto. In FIG. 4, the method for reducing interference includes configuring the processing circuit 10 to execute an anti-interference process that includes the following steps:

Step S40: executing the channel sounding process to scan the plurality of channels of the first frequency band in real time through the second transceiver and the second antenna, and to determine the usage statuses of the plurality of channels in real time.

Step S41: executing the automatic channel selection process to select at least one target channel according to the usage statuses of the plurality of channels.

Similarly, the processing circuit 10 performs weighted calculation on quality of each channel according to channel activity time, channel busy time, channel transmission time, channel reception time, and noise information obtained by the second transceiver 13 and the second antenna 16-2, and finally obtains channel numbers that are recommended to be selected.

In addition, in response to the processing circuit 10 determining that the interference to the channels of the first frequency band is small in the environment, any channel of the first frequency band can be directly selected as the target channel. In response to the processing circuit 10 determining that the frequently used channels of the first frequency band in the environment, such as channel 2 to channel 10, have greater interference, channel 1 can be selected as the target channel, or channel 11 can be selected as the target channel. In some instances, the frequently used channels can be, for example, channel 3 to channel 9, and therefore channel 1 or channel 2 can also be selected as the target channel, or channel 10 or channel 11 can also be selected as the target channel.

Step S42: controlling, according to the selected at least one target channel, the first switch circuit and the second switch circuit to respectively switch to the first signal path and the second signal path corresponding to the at least one target channel.

For example, when channel 1 and/or channel 2 of the eleven channels are/is selected, the first switch circuit 140 can be controlled to be switched to the first signal path formed of the first common terminal C1 and the first terminal P1-2, and the second switch circuit 142 can be controlled to be switched to the second signal path formed of the second terminal P2-2 and the second common terminal C2, so as to filter out the signals from channels other than the channel 1 and/or the channel 2 through the first channel filter F1.

Alternatively, when channel 10 and/or channel 11 of the eleven channels are/is selected, the SP3T switch 51 can be controlled to be switched to the first signal path formed of the first common terminal C1 and the first terminal P1-3, and the SP3T switch S2 can be controlled to be switched to the second signal path formed of the second terminal P2-3 and the second common terminal C2, so as to filter out the signals from channels other than the channel 10 and/or the channel 11 through the second channel filter F2, thereby effectively addressing the ACI issues.

Step S43: obtaining one of the plurality of custom frequency bands that is selected by a user.

As mentioned above, since the custom filters F3, F4, and F5 can be the LTE suppression filter, the 5G suppression filter, and the IoT device suppression filter, respectively, the user can filter for specific frequency bands according to needs.

Step S44: controlling, according to the selected custom frequency band, the third switch circuit and the fourth switch circuit to respectively switch to the third signal path and the fourth signal path corresponding to the selected custom frequency band.

For example, when the user selects the custom filter F3 to suppress LTE signals, the SP3T switch S3 can be controlled to be switched to the third signal path formed of the third common terminal C3 and the first terminal P3-1, and the SP3T switch S4 can be controlled to be switched to the fourth signal path formed of the fourth terminal P4-1 and the fourth common terminal C4, so as to filter the LTE signals through the custom filter F3.

Step S45: controlling the first transceiver to perform signal transmission.

Third Embodiment

Figure 5:
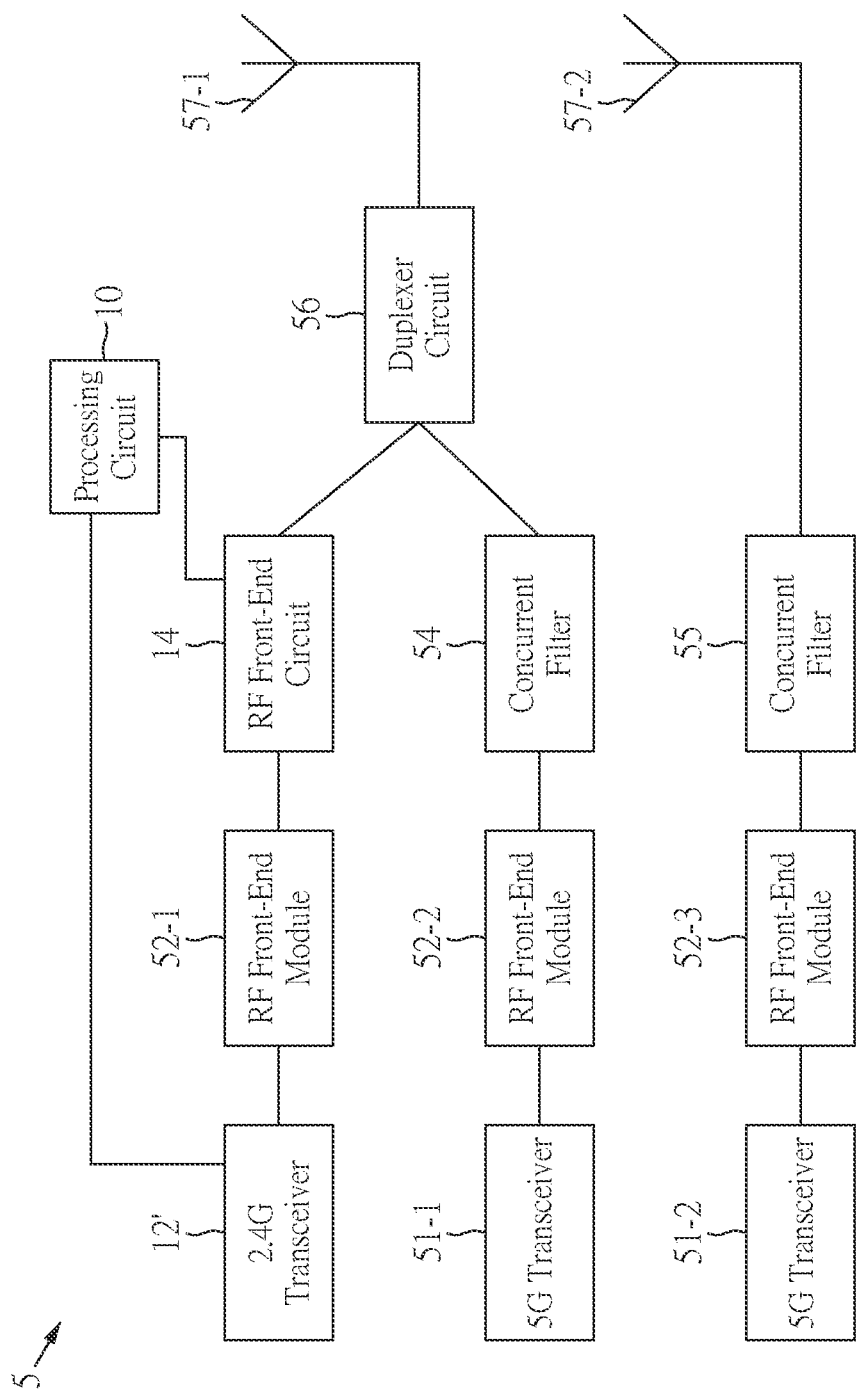
FIG. 5 is a functional block diagram showing a radio frequency front-end system being applied to a dual-band communication system according to a third embodiment of the present disclosure.

Reference is made to FIG. 5, which is a functional block diagram showing that a radio frequency front-end system applied to a dual-band communication system according to a third embodiment of the present disclosure. As shown in FIG. 5, a dual-band communication system 5 includes a 2.4G transceiver 12', 5G transceivers 51-1 and 51-2, RF front-end modules 52-1, 52-2 and 52-3, an RF front-end circuit 14, a processing circuit 10, concurrent filters 54, 55, a duplexer circuit 56, and antennas 57-1, 57-2.

In FIG. 5, the RF front-end modules 52-1, 52-2 and 52-3 can each include the PA, LNA, and LO mentioned above, which will not be repeated here. The 5G transceivers 51-1 and 51-2 cover four sub-bands of 5G. For example, the 5G transceiver 51-1 covers the UNII1 and UNII2a sub-bands, and the 5G transceiver 51-2 covers the UNII2c and UNII3 sub-bands. Furthermore, the antenna 57-1 can be, for example, a dual-band antenna, which can be used to achieve 2.4/5 GHz dual-band operation, and can synchronously transmit/receive 2.4 GHz and 5 GHz band signals through the concurrent filters 54 and 55 and the diplexer circuit 56 during concurrent dual-band operation.

It should be noted that the RF front-end system of the third embodiment of the present disclosure essentially includes the 2.4G transceiver 12', the RF front-end circuit 14, the processing circuit 10, and the antenna 57-1, and an architecture of the RF front-end system can utilize the architecture and the anti-interference process mentioned in the first and second embodiments. In this way, in addition to providing better anti-interference capability for the 2.4 GHz frequency band of the dual-band communication system, specific frequency bands can also be filtered according to user needs or regions (for example, to comply with the relevant regulations of the United States or the European Union).

Beneficial Effects of the Embodiments

In conclusion, in the radio frequency front-end system for reducing interference and the method for reducing interference provided by the present disclosure, an adaptive filtering system with a software-defined algorithm can detect usage statuses of channels, and switch to an appropriate channel filter to address interference issues while establishing reliable communication paths free of interference from other networks or IoT devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A radio frequency front-end system for reducing interference, comprising:

a processing circuit;
a first transceiver connected to the processing circuit;
a radio frequency front-end circuit, including:
  a first switch circuit including a plurality of first signal paths formed by a first common terminal and a plurality of first terminals, wherein the first common terminal is connected to the first transceiver;
  a first filter circuit including an all-pass circuit and a first channel filter respectively connected to the plurality of first terminals, wherein the all-pass circuit corresponds to a plurality of channels of a first frequency band, and the first channel filter corresponds to at least one first channel of the plurality of channels; and
  a second switch circuit including a plurality of second signal paths formed by a second common terminal and a plurality of second terminals, wherein the plurality of second terminals are connected to the all-pass circuit and the first channel filter, respectively; and
a first antenna connected to the second common terminal,
wherein the processing circuit is configured to execute an anti-interference process, including:
  controlling the first switch circuit and the second switch circuit to respectively switch to the first signal path and the second signal path corresponding to the all-pass circuit;
  executing a channel sounding process to scan the plurality of channels of the first frequency band through the first transceiver, so as to determine usage statuses of the plurality of channels;
  executing an automatic channel selection process to select at least one target channel according to the usage statuses of the plurality of channels; and
  controlling, according to the selected at least one target channel, the first switch circuit and the second switch circuit to respectively switch to the first signal path and the second signal path corresponding to the at least one target channel, and controlling the first transceiver to perform signal transmission.

2. The radio frequency front-end system according to claim 1, wherein the first filter circuit further includes a second channel filter, and the plurality of first terminals are connected to the all-pass circuit, the first channel filter, and the second channel filter, respectively, the plurality of second terminals are connected to the all-pass circuit, the first channel filter, and the second channel filter, respectively, and the second channel filter corresponds to at least one second channel of the plurality of channels.

3. The radio frequency front-end system according to claim 2, wherein the first frequency band is a WI-FI 2.4 GHz frequency band, a quantity of the plurality of channels is eleven, the at least one first channel at least corresponds to channel 1 of the plurality of channels, and the at least one second channel at least corresponds to channel 11 of the plurality of channels.

4. The radio frequency front-end system according to claim 3, wherein the radio frequency front-end circuit further includes:
  a third switch circuit including a plurality of third signal paths formed by a third common terminal and a plurality of third terminals, wherein the third common terminal is connected to the second common terminal;
  a second filter circuit including a plurality of custom filters, wherein the plurality of custom filters are respectively connected to the plurality of third terminals and respectively correspond to a plurality of custom frequency bands; and
  a fourth switch circuit including a plurality of fourth signal paths formed by a fourth common terminal and a plurality of fourth terminals, wherein the plurality of fourth terminals are connected to the plurality of custom filters, respectively,
wherein the anti-interference process further includes:
  obtaining one of the plurality of custom frequency bands that is selected by a user; and
  controlling, according to the selected custom frequency band, the third switch circuit and the fourth switch circuit to respectively switch to the third signal path and the fourth signal path corresponding to the selected custom frequency band.

5. The radio frequency front-end system according to claim 1, wherein the anti-interference process further includes:
  controlling the first transceiver to perform signal transmission for a predetermined time, and controlling the first switch circuit and the second switch circuit to switch again to the first signal path and the second signal path corresponding to the all-pass circuit, respectively; and
  executing the channel sounding process again to update the usage statuses of the plurality of channels, and executing the automatic channel selection process again to reselect the at least one target channel according to the usage statuses of the plurality of channels.

6. The radio frequency front-end system according to claim 1, further comprising:
  a second transceiver connected to the processing circuit; and
  a second antenna connected to the second transceiver,
  wherein, in the step of executing the channel sounding process, the processing circuit further controls the second transceiver to scan the plurality of channels of the first frequency band in real time through the second antenna, so as to determine the usage statuses of the plurality of channels in real time.

7. A method for reducing interference applicable to a radio frequency front-end system, wherein the radio frequency front-end system includes:
  a processing circuit;
  a first transceiver connected to the processing circuit;
  a radio frequency front-end circuit, including:
    a first switch circuit including a plurality of first signal paths formed by a first common terminal and a plurality of first terminals, wherein the first common terminal is connected to the first transceiver;
    a first filter circuit including an all-pass circuit and a first channel filter respectively connected to the plurality of first terminals, wherein the all-pass circuit corresponds to a plurality of channels of a first frequency band, and the first channel filter corresponds to at least one first channel of the plurality of channels; and
    a second switch circuit including a plurality of second signal paths formed by a second common terminal and a plurality of second terminals, wherein the plurality of second terminals are connected to the all-pass circuit and the first channel filter, respectively; and
  a first antenna connected to the second common terminal,
  wherein the method for reducing interference comprises configuring the processing circuit to:

control the first switch circuit and the second switch circuit to respectively switch to the first signal path and the second signal path corresponding to the all-pass circuit;

execute a channel sounding process to scan the plurality of channels of the first frequency band through the first transceiver, so as to determine usage statuses of the plurality of channels;

execute an automatic channel selection process to select at least one target channel according to the usage statuses of the plurality of channels; and control, according to the selected at least one target channel, the first switch circuit and the second switch circuit to respectively switch to the first signal path and the second signal path corresponding to the at least one target channel, and control the first transceiver to perform signal transmission.

8. The method according to claim 7, wherein the first filter circuit further includes a second channel filter, and the plurality of first terminals are connected to the all-pass circuit, the first channel filter, and the second channel filter, respectively, the plurality of second terminals are connected to the all-pass circuit, the first channel filter, and the second channel filter, respectively, the second channel filter corresponds to at least one second channel of the plurality of channels.

9. The method according to claim 8, wherein the first frequency band is a WI-FI 2.4 GHz frequency band, a quantity of the plurality of channels is 11, the at least one first channel at least corresponds to channel 1 of the plurality of channels, and the at least one second channel at least corresponds to channel 11 of the plurality of channels.

10. The method according to claim 9, wherein the radio frequency front-end circuit further includes:
a third switch circuit including a plurality of third signal paths formed by a third common terminal and a plurality of third terminals, wherein the third common terminal is connected to the second common terminal;
a second filter circuit including a plurality of custom filters, wherein the plurality of custom filters are respectively connected to the plurality of third terminals and respectively correspond to a plurality of custom frequency bands; and
a fourth switch circuit including a plurality of fourth signal paths formed by a fourth common terminal and a plurality of fourth terminals, wherein the plurality of fourth terminals are connected to the plurality of custom filters, respectively, wherein the method further comprises configuring the processing circuit to:
obtain one of the plurality of custom frequency bands that is selected by a user; and
control, according to the selected custom frequency band, the third switch circuit and the fourth switch circuit to respectively switch to the third signal path and the fourth signal path corresponding to the selected custom frequency band.

11. The method according to claim 8, further comprising:
controlling the first transceiver to perform signal transmission for a predetermined time, and controlling the first switch circuit and the second switch circuit to switch again to the first signal path and the second signal path corresponding to the all-pass circuit, respectively; and
executing the channel sounding process again to update the usage statuses of the plurality of channels, and executing the automatic channel selection process again to reselect the at least one target channel according to the usage statuses of the plurality of channels.

12. The method according to claim 8, wherein the radio frequency front-end circuit further includes:
a second transceiver connected to the processing circuit; and
a second antenna connected to the second transceiver,
wherein the step of executing the channel sounding process further includes configuring the processing circuit to control the second transceiver to scan the plurality of channels of the first frequency band in real time through the second antenna, so as to determine the usage statuses of the plurality of channels in real time.

* * * * *